United States Patent [19]
Wachi et al.

[11] Patent Number: 5,970,026
[45] Date of Patent: Oct. 19, 1999

[54] TEMPERATURE INVARIANT, MAGNETO-OPTIC MODULATOR COIL DRIVING CIRCUIT

[75] Inventors: Shigeaki Wachi, Tokyo; Tetsuji Kawashima, Chiba, both of Japan

[73] Assignee: Sony Corporation, Tokyo, Japan

[21] Appl. No.: 08/079,362

[22] Filed: Jun. 17, 1993

Related U.S. Application Data

[63] Continuation of application No. 07/902,763, Jun. 23, 1992, abandoned, which is a continuation of application No. 07/728,164, Jul. 10, 1991, abandoned.

[30] Foreign Application Priority Data

Jul. 11, 1990 [JP] Japan .................................. 2-181560

[51] Int. Cl.⁶ .......................... G11B 11/12; G11B 13/04
[52] U.S. Cl. ........................... 369/13; 360/114; 360/59; 360/60; 360/66
[58] Field of Search .................... 369/13; 360/114, 360/59, 60, 66

[56] References Cited

U.S. PATENT DOCUMENTS

| | | | |
|---|---|---|---|
| 4,631,713 | 12/1986 | Romeas et al. | 369/54 |
| 4,748,605 | 5/1988 | Sakai et al. | 360/59 |
| 4,750,159 | 6/1988 | Yoda | 360/114 |
| 4,937,802 | 6/1990 | Omori et al. | 369/13 |
| 4,987,501 | 1/1991 | Hori | 360/66 |
| 5,067,032 | 11/1991 | Ida | 360/46 |

FOREIGN PATENT DOCUMENTS

| | | |
|---|---|---|
| 0312143 | 4/1989 | European Pat. Off. . |
| 0 446 892 A3 | 9/1991 | European Pat. Off. . |
| 0 453 161 A2 | 10/1991 | European Pat. Off. . |
| 2182815 | 5/1987 | United Kingdom . |

OTHER PUBLICATIONS

Patent Abstracts of Japan, vol. 14, No. 230 (P–1048), May 16, 1990 & JP–A–20 54 424 (Nippon Columbia), Feb. 23, 1990.

Froess, "Current Reversal in Inductive Loads", IBM Technical Disclosure Bulletin, vol. 11, No. 10, Mar. 1969, p. 1365.

*Primary Examiner*—Hoa T. Nguyen
*Attorney, Agent, or Firm*—Limbach & Limbach L.L.P.

[57] ABSTRACT

A magnetic modulator coil driving circuit comprises: first and second switching elements for inverting the polarity of exciting currents supplied to magnetic modulator coils, first and second bias voltage setting circuit for determining control voltages to be applied to the first and second switching elements to adjust the currents flowing through the first and second switching elements to a predetermined value, and a data input circuit for supplying modulating data to turn on and off the first and second switching elements alternately. The magnetic modulator coil driving circuit applies a control voltage to the control electrode of the corresponding switching element to control the exciting current to be supplied through the switching element to the corresponding magnetic modulator coil so that the exciting current coincides with a desired value when a reference voltage is applied to the control electrode. Thus a fixed exciting current is supplied to the magnetic modulator coil so that the intensity of the magnetic field may not vary due to temperature variation in the magnetic modulator coil and the magnetic modulator coil may not overheat or burn.

5 Claims, 3 Drawing Sheets

FIG. 4(A) PRIOR ART
FIG. 4(B) PRIOR ART
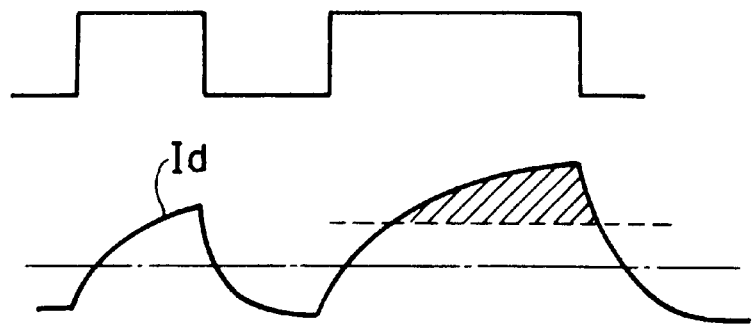
FIG. 4(C) PRIOR ART
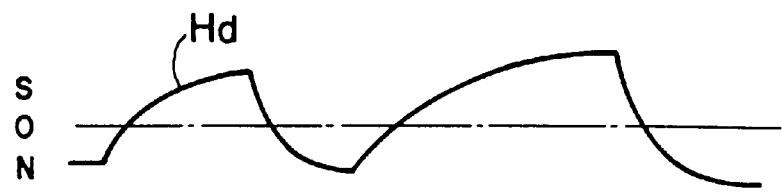
FIG. 5 PRIOR ART
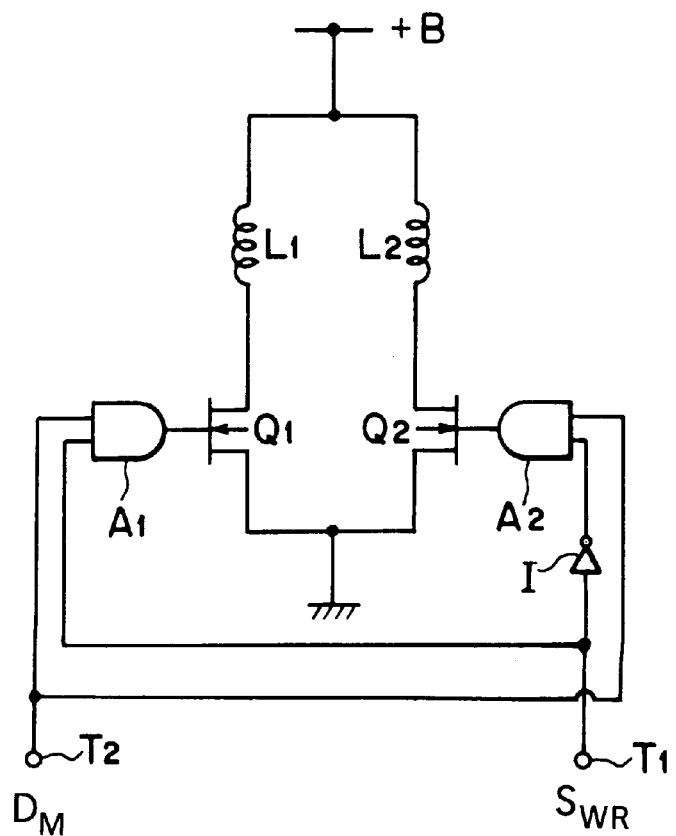

TEMPERATURE INVARIANT, MAGNETO-OPTIC MODULATOR COIL DRIVING CIRCUIT

This is a continuation of application Ser. No. 07/902,763, filed Jun. 23, 1992, now abandoned, which is a continuation of application Ser. No. 07/728,164, filed on Jul. 10, 1991, now abandoned.

BACKGROUND OF THE INVENTION

1. Field of the Invention

The present invention relates to a magnetic modulator coil driving circuit for supplying a current to a magnetic head for applying a magnetic field to a magneto-optic disk in recording data in the magneto-optic disk.

2. Description of the Prior Art

A method capable of overwrite employing magnetic modulation as shown in FIG. 3 has been proposed for recording data in a rewritable magneto-optic disk. This method irradiates the perpendicularly magnetizable film 10a of a magneto-optic disk 10 with a laser beam focused by the objective lens 11 of an optical pickup head to heat the perpendicularly magnetizable film 10a to a temperature not lower than the Curie point, and modulates a magnetic field created by a magnetic head 12 by applying recording signals to a magnetic modulator coil 12a by a driving circuit 13 to record the data in a magnetic pattern corresponding to the variation of the magnetic field in the perpendicularly magnetizable film 10a.

In recording data having a rectangular waveform as shown in FIG. 4A by magnetic modulation, a current Id supplied to the modulator coil 12a of the magnetic head 12 has an integral waveform having a time constant as shown in FIG. 4B. The intensity Hd of the magnetic field created by the magnetic modulator coil 12a has an integral waveform as shown in FIG. 4C substantially similar to that of the waveform of the current Id.

Referring to FIG. 5 showing a conventional magnetic modulator coil driving circuit, there are shown magnetic modulator coils $L_1$ and $L_2$, and switching elements $Q_1$ and $Q_2$, i.e., field-effect transistors. Modulating data $D_M$ applied to a terminal $T_2$ is supplied to one input of each of two AND gates $A_1$ and $A_2$ whose outputs are connected to the gate electrodes of the switching elements $Q_1$ and $Q_2$, respectively. A control signal $S_{WR}$ is applied to a terminal $T_1$ which is connected directly to the other input terminal of the AND gate $A_1$ and, through an invertor I, to the other input terminal of the AND gate $A_2$. The control signal $S_{WR}$ alternately opens and closes the AND gates $A_1$ and $A_2$ so that the modulating data $D_M$ is alternately supplied to the gates of the switching elements $Q_1$ and $Q_2$.

In this magnetic modulator coil driving circuit, a current flows through either the magnetic modulator coil $L_1$ or $L_2$ according to the modulating data to apply a magnetic field of either an N polarity or an S polarity to the magneto-optic disk 10. When either the switching element $Q_1$ or $Q_2$ is turned on, the magnitude of the current Id increases with time as shown in FIG. 4B. A level of the current Id is generated so that a magnetic field of a sufficiently high intensity is applied to the magneto-optic disk 10 even if the pulse width of the recording data is very small. However, if the pulse width of the recording data is comparatively large, an excessive current as indicated by the hatched area in FIG. 4B flows through the magnetic modulator coil $L_1$ or $L_2$ and, in the worst case, the magnetic modulator coil burns out due to overheating.

Since a control voltage that turns on the switching elements $Q_1$ and $Q_2$ in a saturation region has been used, it has been easy to release heat from the switching elements. However, it is difficult to cool the magnetic modulator coils because the magnetic modulator coils must have a lightweight construction to move the same together with the optical head.

Furthermore, temperature variation in the magnetic modulator coil entails the variation of the exciting current and an imperfect erasure of recorded data for overwriting.

SUMMARY OF THE INVENTION

The present invention has been made to solve the foregoing problems and it is therefore an object of the present invention to provide a magnetic modulator coil driving circuit comprising bias voltage setting means for detecting currents flowing through first and second switching elements for inverting currents to be supplied to magnetic modulator coils while the magnetic head is in a trial writing region of a magneto-optic disk and determines a bias voltage for the switching elements so that the currents coincide with a predetermined current, and a data input circuit for the on-off control of the first and second switching elements according to the recording data.

The magnetic modulator coil driving circuit of the present invention controls the exciting current to be supplied through the switching element to the magnetic modulator coil by the voltage applied to the control electrode of the switching element so that the current coincides with a desired value when a reference voltage is applied to the control electrode. Accordingly, a fixed current is supplied to the magnetic modulator coil so that the intensity of the magnetic field may not vary due to temperature variation in the magnetic modulator coil.

Since the fixed current is supplied to the magnetic modulator coil, the overheating and burning of the magnetic modulator coil can be obviated and the rising mode of magnetization when the magnetic field is inverted can be improved.

BRIEF DESCRIPTION OF THE DRAWINGS

The above and other objects, features and advantages of the present invention will become more apparent from the following description taken in connection with the accompanying drawings, in which:

FIGS. 4A, 4B and 4C are waveform charts comparatively showing the respective waveforms of modulating data, exciting current and the intensity of magnetic field in a conventional circuit; and FIG. 5 is a circuit diagram of a conventional magnetic modulator coil driving circuit.

DESCRIPTION OF THE PREFERRED EMBODIMENT

Figure 1:
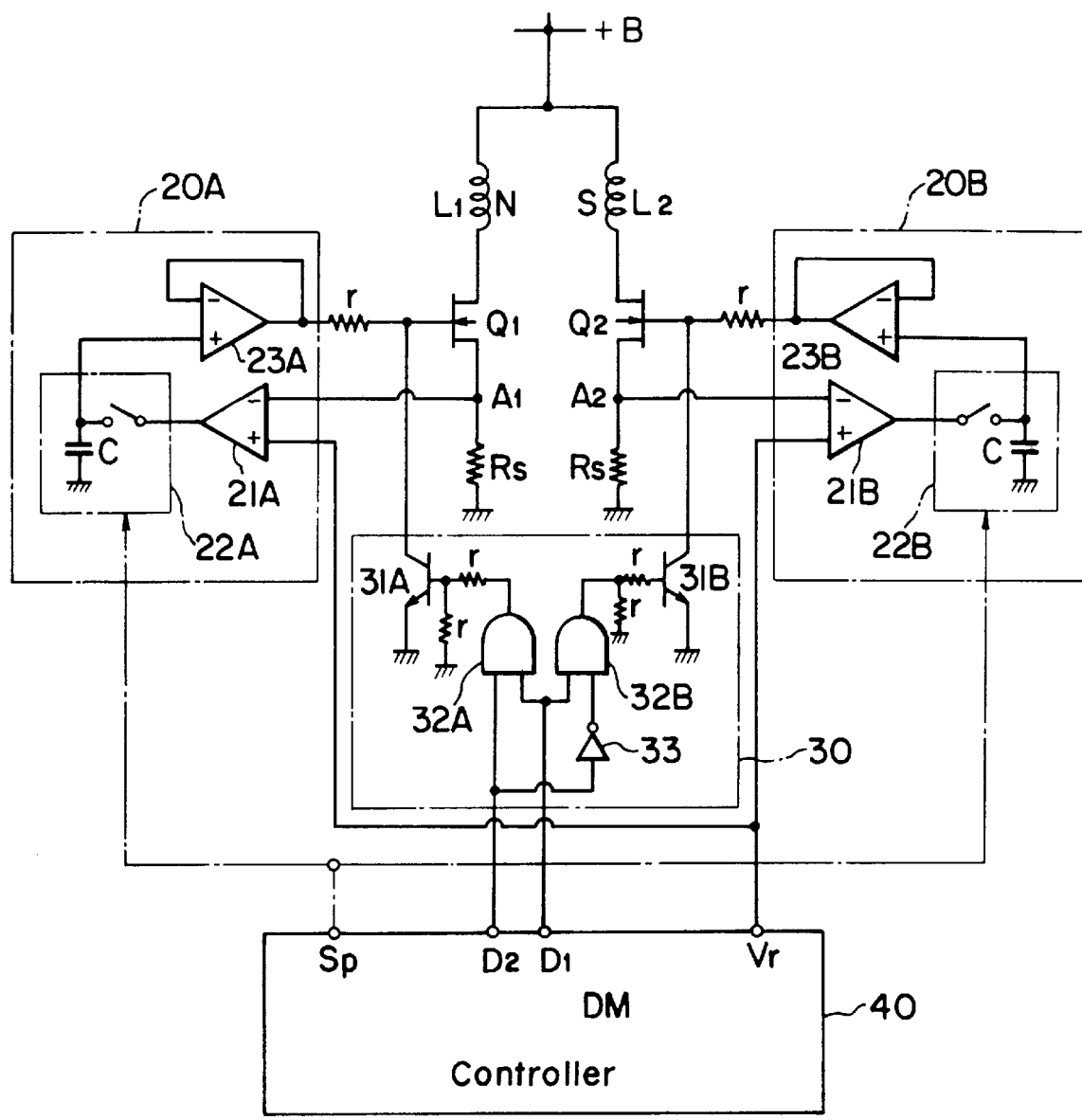
FIG. 1 is a circuit diagram of a magnetic modulator coil driving circuit in a preferred embodiment according to the present invention.

Referring to FIG. 1, there are shown magnetic modulator coils $L_1$ and $L_2$; switching elements $Q_1$ and $Q_2$, such as field-effect transistors; a bias voltage setting circuit 20A for setting a bias voltage for the switching element $Q_1$, comprising a comparator 21A, a sample-hold circuit 22A and a buffer amplifier 23A; a bias voltage setting circuit 20B for setting a bias voltage for the switching element $Q_2$, having a circuit configuration similar to that of the bias voltage setting circuit 20A; a data input circuit 30 for applying modulating signals corresponding to recording data to the switching elements $Q_1$ and $Q_2$ comprising a pair of switching transistors 31A and 31B, AND gates 32A and 32B, and an inverter 33 for inverting polarity; and a controller 40 which applies control signals and modulating data to the bias voltage setting circuits 20A and 20B, and the data input circuit 30. The controller 40 provides modulating data $D_M$ for writing data in a magneto-optic disk and applies a sampling pulse signal $S_P$ and a reference voltage $V_r$ to the bias voltage setting circuits 20A and 20B.

During recording in a trial writing area (ALPC area: Automatic Laser Power Control area) formed in the sector mark of the magneto-optic disk, i.e. in the leading end of each data sector on the disk, the sample pulse signal $S_P$ is generated by the controller 40 and applied to the sample and hold circuits 22A, 22B to cause them to supply separate outputs to the capacitors C, i.e. the switches shown in FIG. 1 are closed. Also during this period, the controller supplies the reference voltage $V_r$ to the inputs to the comparators 21A and 21B to thereby adjust the current that flows through the switching elements $Q_1$ and $Q_2$ to a desired current, as will be explained in greater detail hereinafter.

In operation, modulating data $D_M$ of HIGH is applied to a terminal $D_1$ and a binary signal corresponding to recording data is applied to a terminal $D_2$ in recording data on the magneto-optic disk. The binary signal turns on one of the switching transistors 31A and 31B and turns off the other. If the gate voltage of the switching element $Q_1$ is increased, an exciting current Id flows through the magnetic modulator coil $L_1$ and through a source resistor Rs connected to the source of the switching element $Q_1$, and a voltage drop across the source resistor Rs appears at a node $A_1$. The comparator 21A compares the voltage at the node $A_1$, i.e., a voltage determined by the exciting current Id, with the reference voltage $V_r$, and the sample-hold circuit 22A appears at a node $A_1$. The comparator 21A compares the voltage at the node $A_1$, i.e., a voltage determined by the exciting current Id, with the reference voltage $V_r$, and the sample-hold circuit 22A holds a differential signal provided by the comparator 21A. The output voltage of the sample-hold circuit 22A is applied through the buffer amplifier 23a to the gate of the switching element $Q_1$. Thus, the voltage at the node $A_1$ determining the exciting current Id is maintained at a constant value dependent on the reference voltage $V_r$ by the bias voltage setting circuit 20A.

Figure 2:
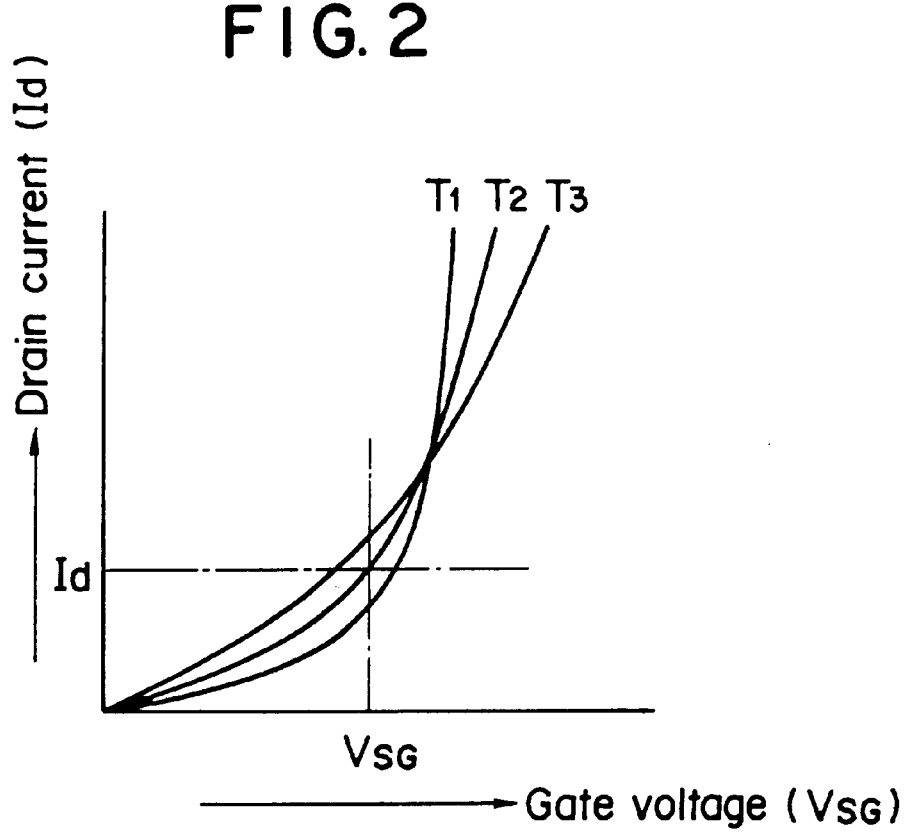
FIG. 2 is a graph showing the Id-$V_{SG}$ characteristics of a field-effect transistor for different temperatures.
Figure 3:
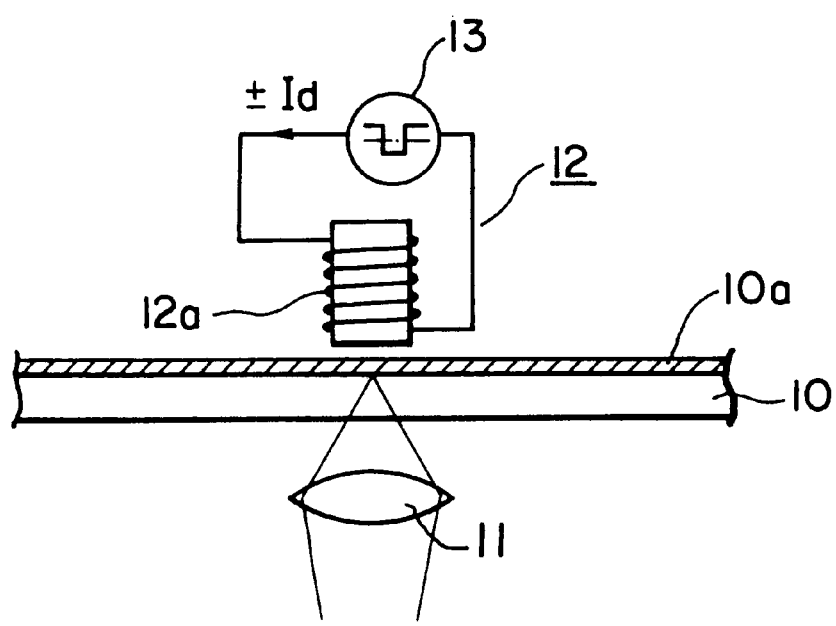
FIG. 3 is a diagrammatic view of assistance in explaining a conventional magneto-optic recording operation.

As shown in FIG. 2, the Id-$V_{SG}$ characteristics, namely, the relation between the drain current and gate voltage, of the field-effect transistor, in general, is dependent on temperature. The present invention determines the gate voltage $V_{SG}$ by the bias voltage setting circuit 20A so that Id×Rs=Vr.

During writing of data in the trial writing area, the controller 40 generates the sampling pulse $S_P$. In response to the sampling pulse $S_P$, the sample and hold circuit 22A is operated to sample and hold the current that flows through the magnetic head during the time that data is being recorded in the trial writing region.

Accordingly, during the period of writing data in the trial writing area a constant exciting current flows continually through the switching element $Q_1$ even if the exciting current Id varies according to the rise of the temperature of the magnetic modulator coil or the temperature characteristics of the switching element $Q_1$, because the voltage at the node $A_1$ is compared with the reference voltage Vr and the gate voltage of the switching element $Q_1$ is corrected so that the voltage at the node $A_1$ coincides with the reference voltage Vr.

The same control operation is performed also for the switching element $Q_2$, in which the gate voltage of the switching element $Q_2$ is controlled so that the voltage at a node $A_2$ coincides with the reference voltage Vr.

As shown in FIGS. 4A to 4C, the reference voltage Vr is chosen so that a magnetic field of a predetermined intensity is created for a dot mark on the magneto-optic disk represented by a recording data pulse of a predetermined minimum pulse width to prevent the excessive heat generation of the magnetic modulator coil.

Since the switching elements $Q_1$ and $Q_2$ of the magnetic modulator coil driving circuit operate in the unsaturation region, the inverted magnetic field rises quickly, so that the recording data can be recorded in high resolution.

Thus the controller 40, during the writing of trial data in a trial writing area of a given sector on the magneto-optic disk 10, supplies the reference voltage $V_r$ to the first comparator 21A and the second comparator 21B, modulating data signals corresponding to the trial data to the data input circuit 30, and a sample pulse control signal $S_P$ to the first sample and hold circuit 22A and the second sample and hold circuit 22B to cause the first sample and hold circuit 22A and the second sample and hold circuit 22B to sample and hold the outputs of the first and second comparators 21A and 21B, respectively, during the writing of trial data in the trial writing area of the given sector and to thereafter supply the sampled and held outputs of the first comparator 21A and the second comparator 21B as inputs to the first buffer amplifier 23A and the second buffer amplifier 23B, respectively, during a time when data is being recorded in the given data sector.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A driving circuit for supplying electrical currents to a pair of magnetic modulator coils in a magneto-optic recording apparatus for writing and erasing data on a magneto-optic recording medium which is divided into data sectors, each sector having a trial writing area at the beginning of the sector on which trial data are written by the magneto-optic recording apparatus during a trial writing period, comprising:

means for supplying electrical currents;

first and second switching elements separately connected in series with the means for supplying electrical currents and each of the magnetic modulator coils, respectively, to control currents flowing through the magnetic modulator coils when the magneto-optic recording apparatus is recording data on the magneto-optic recording medium;

first and second bias voltage setting circuits for detecting currents flowing through the first and second switching elements, respectively, during a time when the magneto-optic recording apparatus is recording trial data in a trial writing area of a given sector of the magneto-optic recording medium, generating first and second control voltages corresponding to the detected currents flowing through the first and second switching elements, respectively, and applying the first and second control voltages, respectively, to the first and second switching elements to cause the first and second switching elements to restrict the currents flowing through the magnetic modulator coils, respectively, to a predetermined value while the magneto-optic recording apparatus is recording data in the given sector; and a data input circuit coupled to the first and second switching elements for supplying modulating data to the first and second switching elements to turn on and off the first and second switching elements alternately.

2. A magnetic modulator coil driving circuit according to claim 1, wherein the first bias voltage setting circuit comprises a first resistor in series with the first switching element, a first comparator for comparing the voltage drop across the first resistor and an externally supplied reference voltage, and a first sample-hold circuit means for sampling and holding the output of the first comparator and supplying the sampled and held output of the first comparator to control the first switching element, and the second bias voltage setting circuit comprises a second resistor in series with the second switching element, a second comparator for comparing the voltage drop across the second resistor and a reference voltage, and a second sample-hold circuit means for sampling and holding the output of the second comparator and supplying the sampled and held output of the second comparator to control the second switching element.

3. A magnetic modulator coil driving circuit according to claim 1, wherein the first and second switching elements are field-effect transistors.

4. A magnetic modulator coil driving circuit, for use in a magneto-optical recording system including laser light means and magnetic biasing means, having a first coil and a second coil, for generating and directing a light beam and a magnetic field, respectively, to a magneto-optical recording medium which is divided into data sectors, each sector having a trial writing area at the beginning of the sector on which a trial data are written during a trial writing period, comprising:

means for supplying electrical currents;

a series connection of a first switching means and a first resistor connected in series with the means for supplying electrical currents and the first coil, the first switching means being provided with a first control terminal;

a series connection of a second switching means and a second resistor connected in series with the means for supplying electrical currents and the second coil, the second switching means being provided with a second control terminal;

first bias voltage setting circuit means which includes a first comparator for comparing a voltage drop across the first resistor with a reference voltage, a first sample and hold circuit for sampling and holding an output of the first comparator, and a first buffer amplifier for receiving an output of the first sample and hold circuit and supplying an amplified output signal to the control terminal of the first switching means;

second bias voltage setting circuit means which includes a second comparator for comparing a voltage drop across the second resistor with a reference voltage, a second sample and hold circuit for sampling and holding an output of the second comparator, and a second buffer amplifier for receiving an output of the second sample and hold circuit and supplying an amplified output signal to the control terminal of the second switching means;

a data input circuit for supplying modulating data signals to the first control terminal and the second control terminal to turn on and off, alternately, the first and second switching means; and control means for supplying, during the writing of trial data in a trial writing area of a given sector on the magneto-optic disk, the reference voltage to the first comparator and the second comparator, supplying modulating data signals corresponding to the trial data to the data input circuit, and supplying a control signal to the first sample and hold circuit and the second sample and hold circuit to cause the first sample and hold circuit and the second sample and hold circuit to sample and hold the outputs of the first and second comparators, respectively, during the writing of trial data in the trial writing area of the given sector and to thereafter supply the sampled and held outputs of the first comparator and the second comparator as inputs to the first buffer amplifier and the second buffer amplifier, respectively, during a time when data is being recorded in the given data sector.

5. A magnetic modulator coil driving circuit according to claim 4, wherein the first and second switching means are field-effect transistors.

* * * * *